United States Patent [19]
Peloquin

[11] Patent Number: 5,948,959
[45] Date of Patent: Sep. 7, 1999

[54] CALIBRATION OF THE NORMAL PRESSURE TRANSFER FUNCTION OF A COMPLIANT FLUID-FILLED CYLINDER

[75] Inventor: Mark S. Peloquin, Uncasville, Conn.

[73] Assignee: The United States of America as represented by the Secretary of the Navy, Washington, D.C.

[21] Appl. No.: 08/865,150

[22] Filed: May 29, 1997

[51] Int. Cl.[6] .......................... G01M 1/14; G01N 29/00; G01V 13/00; H04R 1/02
[52] U.S. Cl. ............................................ 73/1.83; 367/154
[58] Field of Search ..................... 73/1.57, 1.66, 73/1.77, 1.82, 1.83; 367/13, 124, 130, 154, 166, 171

[56] References Cited

U.S. PATENT DOCUMENTS

| | | | |
|---|---|---|---|
| 4,223,397 | 9/1980 | Bakewell, Jr. et al. | 73/1.83 X |
| 4,290,123 | 9/1981 | Pickens | 73/1.83 X |
| 4,320,468 | 3/1982 | Montross | 73/1.83 X |
| 5,473,578 | 12/1995 | Konrad | 73/1.83 X |
| 5,530,678 | 6/1996 | Kosalos | 367/13 |
| 5,535,176 | 7/1996 | Yang | 367/13 |
| 5,550,791 | 8/1996 | Peloquin | 367/154 X |
| 5,757,721 | 5/1998 | Hull | 367/13 |

OTHER PUBLICATIONS

Peloquin, Mark S.; A Closed–Form Dynamic Elasticity Solution to the Fluid/Structure Interaction Problem of a Two–Layer Infinite Viscoelatic Cylinder with Inner and Outer Fluid Loading Subject to Forced Harmonic Excitation, NUWC–NPT Technical Report 11,067 Dec. 29, 1995.

Primary Examiner—Harshad Patel
Assistant Examiner—Robin C. Clark
Attorney, Agent, or Firm—Michael J. McGowan; Prithvi C. Lall; James M. Kasischke

[57] ABSTRACT

A method is presented to calibrate the transfer function for a fluid-filled compliant cylinder as a function of wavenumber and frequency. An air-filled compliant cylinder has a first linear array of force sensors coupled to the cylinder's exterior surface. A turbulent flow field is generated in a fluid environment about the first linear array which generates an output indicative of pressure incident thereupon. A fluid-filled compliant cylinder identical in diameter to the air-filled compliant cylinder houses a second linear array of force sensors. A similar turbulent flow field is generated in the fluid environment about the fluid-filled complaint cylinder to generate an output indicative of pressure incident upon the second linear array. The ratio of outputs is indicative of the transfer function of the fluid-filled compliant cylinder. Each output can be further adjusted by a calibrated sensitivity of the corresponding first and second linear arrays. The method compensates for elastic scattered pressure fields and the wavenumber-frequency dependence of the air-filled compliant cylinder's sensitivity to pressure.

10 Claims, 1 Drawing Sheet

U.S. Patent  Sep. 7, 1999  5,948,959
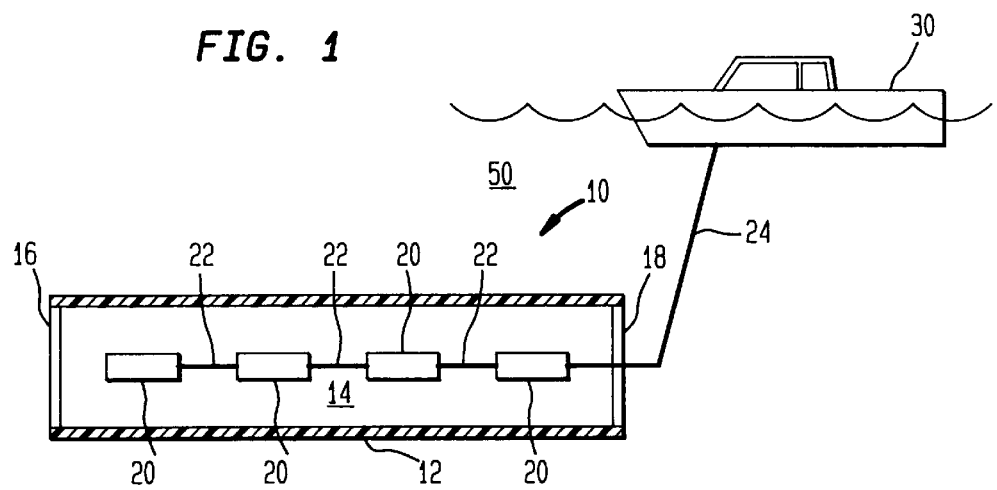
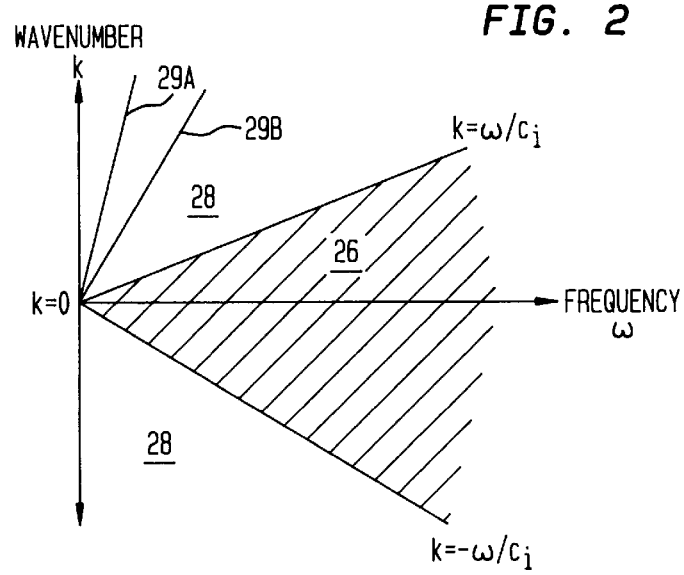
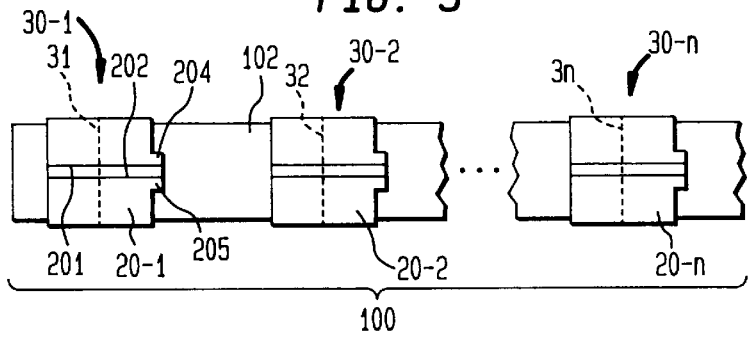
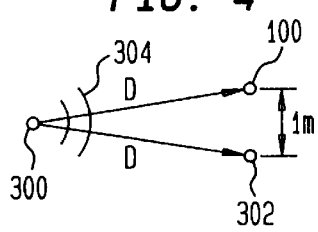
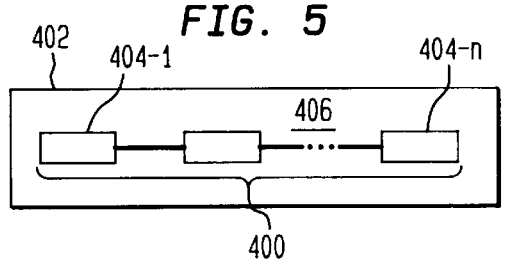

CALIBRATION OF THE NORMAL PRESSURE TRANSFER FUNCTION OF A COMPLIANT FLUID-FILLED CYLINDER

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to determining the transfer function of a fluid-filled compliant cylinders and more particularly to a field method by which the calibration of the transfer function of a fluid-filled compliant cylinder is measured as a function of temporal frequency and spatial frequency (or wavenumber).

(2) Description of the Prior Art

Towed acoustic arrays are used in a variety of commercial and military applications. For example, towed arrays are used in seismic survey applications as well as in antisubmarine warfare applications. In general a towed array is used to measure a pressure field propagating in a fluid environment.

A towed array typically consists of a compliant (e.g., rubber or plastic) fluid-filled hose or cylinder containing an array of hydrophones or other sensors for making measurements of the pressure field incident upon its outer surface. The pressure field of interest will be referred to hereinafter as the signal. When there is relative movement between the fluid environment and the cylinder (e.g., the cylinder is towed or the cylinder is stationary and the fluid environment is moving), a turbulent pressure field develops which also impinges on the outer surface of the cylinder. This pressure field will be referred to hereinafter as the noise pressure field.

The major elements of the noise pressure field are separated in spatial frequency or wavenumber from the signal and can be filtered by a spatial filter. The cylinder acts as the first and primary spatial filter to the noise pressure field arising from the turbulent boundary layer. As such, it is desirable to be able to calibrate or measure the attenuation provided by the cylinder transfer function $T_H(k,\omega)$ as a function of the spatial frequency or wavenumber k and the frequency $\omega$. The cylinder transfer function $T_H(k,\omega)$ is defined as the ratio of inner pressure to outer pressure according to equation (1)

$$T_H(k,\omega)=P_i(k,\omega)/P_o(k,\omega) \quad (1)$$

where $P_i(k,\omega)$ is the pressure field measured in the fluid in the cylinder at a radius r and $P_o(k,\omega)$ is the pressure field impressed on the outer surface of the cylinder. At present, no impressed on the outer surface of the cylinder. At present, no methods exist to field calibrate the cylinder transfer function $T_H(k,\omega)$ in which pressure fields $P_i(k,\omega)$ and $P_o(k,\omega)$ are measured.

SUMMARY OF THE INVENTION

Accordingly, it is an object of the present invention to provide a measurement method of calibrating the transfer function of a fluid-filled compliant cylinder.

Another object of the present invention is to provide a measurement method of calibrating the transfer function to normal pressure for a fluid-filled compliant cylinder as a function of wavenumber and frequency.

Other objects and advantages of the present invention will become more obvious hereinafter in the specification and drawings.

In accordance with the present invention, a method is presented to calibrate the transfer function for a fluid-filled compliant cylinder as a function of wavenumber and frequency. A first compliant cylinder is filled with air and has a first linear array of force sensors (e.g., pressure or strain sensors) coupled to the cylinder's exterior surface. The first compliant cylinder is made from an elastomeric material that has enough stiffness to prevent cylinder collapse under hydrostatic operational pressures. The force sensors are spaced along the length of the cylinder. The first compliant cylinder with its first linear array coupled thereto are immersed in a fluid environment. A first turbulent flow field is generated in the fluid environment such that it is experienced by the first linear array. A first output generated by the first linear array in the first turbulent flow field is measured and is indicative of pressure incident upon the first linear array. A second compliant cylinder having an identical outside diameter measurement as the first compliant cylinder houses a second linear array of force sensors spaced along a central longitudinal axis thereof. The second compliant cylinder is made from a more flexible elastomeric material than that used for the first compliant cylinder. The second compliant cylinder is further filled with a fluid that surrounds the second linear array. The second compliant cylinder with its second linear array contained therein is immersed in the fluid environment. A second turbulent flow field (substantially equivalent to the first turbulent flow field) is then generated in the fluid environment about the second complaint cylinder. A second output generated by the second linear array is then measured and is indicative of pressure incident upon the second linear array. A ratio of the first output to the second output is indicative of the transfer function of the fluid-filled compliant cylinder. Each output can be further adjusted by a calibrated sensitivity of the corresponding first and second linear arrays. Elastic scattered pressure field effects are removed from the pressure measurements via dynamic elasticity models of each cylinder. The wavenumber-frequency dependence of the first compliant cylinder's sensitivity to pressure is also removed by application of the dynamic elasticity models.

BRIEF DESCRIPTION OF THE DRAWINGS

Other objects features and advantages of the present invention will become apparent upon reference to the following description of the preferred embodiments and to the drawings, wherein corresponding reference characters indicate corresponding parts throughout the several views of the drawings and wherein:

FIG. 1 is a schematic of a pressure-field sensing array being towed through the water by a ship;

FIG. 2 is a graph of wavenumber k versus frequency $\omega$ for the fluid in the array's cylinder indicating the propagating and non-propagating regions of the wavenumber-frequency plane;

FIG. 3 is a side view of a composite hydrophone array assembly used in the method of the present invention;

FIG. 4 is a schematic of an acoustic calibration set-up used to measure the acoustic sensitivity of the composite hydrophone array assembly; and FIG. 5 is a schematic of a fluid-filled compliant cylinder housing an array of hydrophones therein for measuring the inner pressure field generated in the cylinder due to a pressure field impinging on the outside of the cylinder.

DESCRIPTION OF THE PREFERRED EMBODIMENT(S)

Referring now to the drawings, and more particularly to FIG. 1, a pressure-field sensing array is shown and is referenced generally by the numeral 10. A sealed elastic or compliant hose or cylinder 12 is filled with a fluid 14. Sealing of cylinder 12 at either end thereof can be accomplished with end caps or bulkheads 16 and 18 as is known in the art. The length of cylinder 12 is not limited. Typically, cylinder 12 is made from a fairly flexible elastomer such as a rubber or urethane material, e.g., ESTANE 58881 or ESTANE 58886 available commercially from BF Goodrich. Other suitable materials include melt-process rubbers such as ALCRYN 1160, 1180 or 3155 commercially available from DuPont.

Maintained within cylinder 12 are a plurality of hydrophones 20 spaced apart from one another along the length of cylinder 12. Electronics (not shown) associated with each hydrophone 20 can be included within cylinder 12 or can be maintained on a host platform, e.g., on a ship 30, to which array 10 is tethered. Typically, hydrophones 20 are coupled to one another via communication lines 22, and are further coupled to ship 30 over a tether/communication line 24. In a typical scenario, array 10 is immersed in a fluid environment 50, e.g., seawater, and is towed therethrough by ship 30. The movement of fluid environment 50 over cylinder 12 generates noise pressure fields over a broad frequency spectrum. The method of the present invention calibrates the transfer function of the system presented by cylinder 12/fluid 14 as a function of temporal frequency and spatial frequency (or wavenumber).

The mathematical space for discussing the present invention is known as the wavenumber-frequency space or plane defined by the relationship $k=2\pi/\lambda$, where k is the wavenumber in radians/meter and $\lambda$ is the spatial wavelength of vibration of cylinder 12. Within the wavenumber-frequency plane, the pressure field in either fluid 14 or outer fluid environment 50 is characterized by two distinct regions, the propagating and non-propagating regions. The propagating region for inner fluid 14 is contained between the lines $k=\pm\omega/c_i$ and is hatched as shown at 26 in FIG. 2. In propagating region 26, the radial variation of the pressure field follows the Bessel function of the first kind, and does not undergo decay with respect to radial position within cylinder 12. The remainder of the wavenumber-frequency plane comprises the non-propagating regions 28 where $|k|>|\omega/c_i|$. Pressure fields in non-propagating regions 28 impinging on the outer surface of the cylinder undergo an exponential decay. The decay follows a modified Bessel function where decay varies with respect to radial position within cylinder 12.

Also shown in FIG. 2 are lines 29A and 29B representing the convective ridge for two different tow speeds $v_1$ and $v_2$, respectively. The convective ridge is the region of the wavenumber-frequency plane in which the calibration is occurring. This ridge is the region where most of the energy exists in the turbulent boundary layer. The convective ridge is influenced by the relative motion between the surface of the cylinder and the outer fluid. Pressure levels in the convective ridge are at least an order of magnitude (ten times) greater than the noise pressure level that exists across the propagating region.

The magnitude of the inner fluid pressure field $P_i$, normalized by the outer fluid pressure field magnitude $P_o$, is expressed in decibels (dB) according to the following equation $$10\log\left(\frac{P_i(r_1)}{P_o}\right)^2 \qquad (2)$$

where $r_1$ is the radial distance from the central longitudinal axis of cylinder 12 at which the inner pressure field is evaluated. The mathematical derivation of the dynamic response is contained in "A Closed-Form Dynamic Elasticity Solution to the Fluid/Structure Interaction Problem of a Two-Layer Infinite Viscoelastic Cylinder With Inner and Outer Fluid Loading Subject to Forced Harmonic Excitation," by M. S. Peloquin, NUWC-NPT Technical Report 11,067, Naval Undersea Warfare Center, Newport, R.I., June 1996, the contents of which are hereby incorporated by reference.

In order to measure the outer pressure field $P_o$ for calibration of the transfer function $T_H$, the present invention utilizes a multi-channel composite hydrophone array assembly such as that disclosed by this applicant in U.S. Pat. No. 5,550,791. As shown schematically in FIG. 3, applicant's patented composite hydrophone array assembly 100 is made from a compliant hollow cylinder 102 and wraps 20-1, . . . , 20-n of piezoelectric film adhered to cylinder 102 at a plurality of locations thereon. The material used for cylinder 102 must be somewhat stiffer than the compliant material used for cylinder 12 because cylinder 102 is air-backed and must withstand hydrostatic pressure. A design goal for cylinder 102 is for it to have the flattest response possible in the wavenumber-frequency plane so that wavenumber-frequency pressure variations are minimized. Suitable materials for cylinder 102 include polycarbonate or other materials similar thereto.

Each location wrapped with piezoelectric film defines a composite force sensor or hydrophone channel 30-1, . . . , 30-n. The respective centers 31, . . . , 3n of adjacent hydrophone channels are separated along the length of cylinder 102. In its simplest form, each wrap is a single wrap of piezoelectric film glued over its entire area of contact with the circumference of cylinder 102. The edges of a wrap, e.g., edges 201 and 202 of wrap 20-1, can butt up against one another as shown, overlap slightly, or continue around the circumference of cylinder 102 multiple times. Edges 201 and 202 preferably have tabs 204 and 205, respectively, extending therefrom for purpose of providing pads for connection to electrical leads (not shown). Array assembly 100 is constructed so that each channel 30-1, . . . , 30-n is of uniform sensitivity as a function of its length in the longitudinal or axial direction of array assembly 100.

Before utilizing array assembly 100 in the measurement of the outer pressure field $P_o$, it is necessary to determine its acoustic sensitivity. Such an acoustic sensitivity calibration is performed as follows. As shown in FIG. 4, array assembly 100 is placed a distance D from an acoustic source 300. A reference hydrophone 302 is also placed a distance D from source 300. Since it is desired for array assembly 100 and reference hydrophone 302 to experience the same pressure field, array assembly 100 and reference hydrophone 302 are only spaced apart from one another by some small distance (e.g., one meter). Each is also oriented to have pressure waves 304 from source 300 impinge thereon from a broadside direction where wavenumber k is equal to 0.

Array assembly 100 produces a total pressure response $P_{T\text{-}100}$ at the outer surface of cylinder 102 that is the sum of the incident field $P_{o\text{-}100}$ and the elastic scattered field $P_{s\text{-}100}$ or $$P_{T-100} = P_{o-100} + P_{s-100} \quad (3)$$

A similar relationship exists at reference hydrophone 302, except that it is safe to assume that the elastic scattered field from reference hydrophone 302 is sufficiently small so that it can be ignored (as is generally the practice for reference hydrophones). Therefore, the total pressure response $P_{T-302}$ at reference hydrophone 302 is given by $$P_{T-302} = P_{o-302} \quad (4)$$

Since array assembly 100 is constructed on an air-backed cylinder 102, it is necessary to explore the elastic scattered field produced by the radial vibration of cylinder 102 in response to pressure waves from source 300. By using the dynamic elasticity model disclosed in applicant's aforereferenced publication, it can be shown that $P_{s-100}$ is sufficiently small so that it too can be neglected. More specifically, for typical cylinder constructions used in towed acoustic arrays, applicant's dynamic elasticity model indicated that ignoring $P_{s-100}$ introduced less than 1% error at frequencies below 500 Hz and only 1% error at frequencies above 500 Hz. Thus, the total pressure response $P_{T-100}$ at array assembly 100 and $P_{T-302}$ at reference hydrophone 302 can be considered similar enough to produce a good calibration of acoustic sensitivity for array assembly 100.

Calibration of array assembly 100 is performed using only sound arriving directly from acoustic source 300, i.e., all reflected paths are eliminated by time gating the output of array assembly 100 as is known in the art. Such restrictions on calibration make the relationship $$P_{o-100} = P_{o-302} \quad (5)$$

true. Thus, the measured acoustic sensitivity $S_{a-100}$ of array assembly 100 is calculated from the voltage $V_{channel}$ measured from any channel of array assembly 100 and the measured incident pressure $P_{o-302}$ as follows $$S_{a-100} = \frac{V_{channel}}{P_{o-302}} \quad (6)$$

With the acoustic sensitivity $S_{a-100}$ of array assembly 100 known, the incident pressure field $P_{o-100}(k,\omega)$ at array assembly 100 can be measured as a function of wavenumber k and frequency $\omega$. As described in applicant's U.S. Pat. No. 5,550,791, array assembly 100 defines a multiplicity of channels spaced along the length thereof. Each channel's sensor responds to circumferential strain in cylinder 102 induced by pressure field $P_{a-100}(k,\omega)$. In order to generate $P_{o-100}(k,\omega)$ having a broad wavenumber content, it is necessary to place array assembly in a turbulent flow field. One way of accomplishing this is to tow array assembly 100 through a fluid environment, e.g., water. Alternatively, array assembly 100 could be maintained stationary in a moving fluid environment.

The energy in a turbulent flow field is concentrated at convective wavenumbers $k_c$ according to the relationship $k_c = \omega/c_c$, where $c_c$ is the convection velocity. Thus, the calibration will be performed along the convective ridge or the slope in the wavenumber-frequency plane that corresponds to the convective wavenumbers $k_c$. The convective velocity $c_c$ is proportional to the free stream velocity of the flow. Therefore, by towing array assembly at a variety of tow speeds, it is possible to vary the free stream velocity of the flow and obtain the calibration over a broad range of wavenumbers and frequencies. However, for simplicity, the remainder of the description will address only one tow speed.

The response of array assembly 100 is not totally accounted for by the acoustic sensitivity $S_{a-100}$ since an acoustic calibration is confined to wavenumbers within the range $\pm\omega/c_d$ where $c_d$ is the dilatation wave velocity of plane wave propagation in water, i.e., the acoustic calibration was confined to the case k=0. Accordingly, it is necessary to augment the measured sensitivity $S_{a-100}$ in order to obtain an acoustic sensitivity for a broad range of wavenumbers and frequency. To do this, a mathematical response model disclosed by applicant in the aforereferenced publication is used to develop a broad-range wavenumber and frequency composite sensitivity $S_{c-100}$ for array assembly 100.

The sensitivity of array assembly 100 can also be written $$S_V \times S'_\epsilon \quad (7)$$

where the voltage-to-circumferential strain ratio $S_V$ is equal to $$\frac{V_{channel}}{\epsilon_{102}} \quad (8)$$

where $\epsilon_{102}$ is the circumferential strain at the outer surface of cylinder 102. The general circumferential strain-to-pressure sensitivity $S'_\epsilon$ is equal to $$\frac{\epsilon_{102}}{P_{o-100}} \quad (9)$$

The general circumferential strain-to-pressure sensitivity $S'_\epsilon$ can be expanded into a low wavenumber, low-frequency constant term and a normalized field sensitivity by the following relationship $$S'_\epsilon = (S_\epsilon|_{k=0, \omega=\min}) \frac{S_\epsilon(k, \omega)}{S_\epsilon|_{k=0, \omega=\min}} \quad (10)$$

where the expression "$\omega = \min$" means a frequency in the range of 3–5 Hz.

The acoustic calibration conditions used in the present invention confine the measured acoustic sensitivity $S_{a-100}$ to be a product of $S_V$ and the low wavenumber, low-frequency term of equation (10). Written mathematically, $$S_{a-100} = S_V(S_\epsilon|_{k=0, \omega=\min}) \quad (11)$$

Substitution of equation (10) into equation (7) while making use of equation (11) results in a composite sensitivity $S_{c-100}$ $$S_{c-100} = S_{a-100} S_n = S_{a-100} \left( \frac{S_\epsilon(k, \omega)}{S_\epsilon|_{k=0, \omega=\min}} \right) \quad (12)$$

Thus, composite sensitivity $S_{c-100}$ becomes the product of acoustic sensitivity $S_{a-100}$ and a term that represents the normalized wavenumber-frequency field sensitivity referred to hereinafter as $S_n$. As discussed in detail in applicant's aforereferenced publication, the $S_n$ term can be written as a function of strain/pressure relations $$S_n = \frac{\left[ \frac{\epsilon_{102}}{P_{o-100}} (k, \omega) \right]}{\left[ \frac{\epsilon_{102}}{P_{o-100}} \big|_{k=0, \omega=\min} \right]} \quad (13)$$

Substituting equation (13) into equation (12), $$S_{c-100} = S_{a-100} \frac{\left[\frac{\epsilon_{102}}{P_{o-100}}(k, \omega)\right]}{\left[\frac{\epsilon_{102}}{P_{o-100}}\bigg|_{k=0, \omega=\min}\right]} \quad (14)$$

For a given data collection cycle consisting of towing array assembly 100 at a given tow velocity, the output voltage of the array is designated $V_{100}(k,\omega)$ and the composite sensitivity is $S_{c-100}(k,\omega)$. Output voltage $V_{100}(k,\omega)$ is divided by the composite sensitivity $S_{c-100}(k,\omega)$ to obtain a measurement of the pressure $P_{o-100}$ incident upon the outer surface of array assembly 100 or $$P_{o-100}(k, \omega) = \frac{V_{100}(k, \omega)}{S_{c-100}(k, \omega)} \quad (15)$$

Note that equation (15) is predicated upon the earlier assumption that $P_{T-100}$ can be considered equal to $P_{o-100}$, i.e., $P_{S-100}$ is nearly zero. However, the voltage generated by array assembly 100 during towing (or $V_{100}(k,\omega)$) is in truth proportional to the total pressure acting on the outer surface of a coating (not shown) that would typically coat the hydrophone elements bonded to the surface of cylinder 102. Within the range of the unaliased wavenumber space of array assembly 100, the elastic scattered to incident pressure ratio or $$\left[\frac{P_{s-100}}{P_{o-100}}(k, \omega)\right] \quad (16)$$

is typically on the order of −30 dB. Maintaining the assumption that $P_{T-100} = P_{o-100}$ introduces a maximum error of approximately 3% into the value obtained for $P_{o-100}(k,\omega)$. If this error is unacceptable, or if array assembly 100 had a larger unaliased wavenumber range (which would increase the ratio in equation (16)), a correction for the elastic scattered field would be necessary.

The total pressure $P_{T-100}$ for the field can be written $$P_{T-100}(k, \omega) = P_{o-100}(k, \omega)\left(1 + \left[\frac{P_{s-100}}{P_{o-100}}(k, \omega)\right]\right) \quad (17)$$

The correction for the elastic scattered field is obtained by substituting equation (15) into equation (17) and solving for the incident pressure field $P_{0-100}(k,\omega)$ where, in its expanded form using equation (14), $$P_{o-100}(k, \omega) = \frac{V_{100}(k, \omega)}{\left(S_{a-100}\frac{\left[\frac{\epsilon_{102}}{P_{o-100}}(k, \omega)\right]}{\left[\frac{\epsilon_{102}}{P_{o-100}}\bigg|_{k=0, \omega=\min}\right]}\right)\left(1 + \left[\frac{P_{s-100}}{P_{o-100}}(k, \omega)\right]\right)} \quad (18)$$

For best accuracy, equation (18) will be used in the remainder of the description to define the incident pressure field $P_{o-100}(k,\omega)$.

One last effect that will add an unwanted wavenumber filter function to the measurement of either $P_{o-100}(k,\omega)$ or $P_{T-100}(k,\omega)$ is the filtering, i.e., attenuation, that occurs due to the axial dimension of the sensors used in array assembly 100. Attenuation increases as wavenumber increases. Such attenuation can be accounted for in the calculation of pressure at the surface of array assembly 100 by dividing equation (18) (or equation (15) if the elastic scattered field of array assembly 100 is assumed to be zero) by the well known sensor aperture function $A_{100}(k,\omega)$ which varies only with respect to wavenumber k. This function is disclosed in Burdic, William S., *Underwater Acoustic Systems Analysis*, Prentice-Hall, Inc., 1984.

The next step in the present invention involves the measurement of the inner pressure field $P_i(k,\omega)$. To do this, a compliant hollow cylinder 402 is configured as shown in FIG. 5. Cylinder 402 (identical in outer diameter to cylinder 12 and cylinder 102) houses a linear array of force sensors 404-1, . . . , 404-n forming array assembly 400. The number of force sensors used for each of array assembly 100 and array assembly 400 is approximately the same. The spacing between force sensors in array assembly 400 should be approximately equivalent to the spacing used for array assembly 100 such that there is an area of overlap between array assembly 100 and array assembly 400 in the wavenumber-frequency plane. Each of force sensors 404-1, . . . , 404-n can be conventional air-backed, nodal-mounted ceramic cylinder hydrophone. Such hydrophones are available commercially from Benthos Inc., North Falmouth Mass. Cylinder 402 is further filled with a fluid 406 (identical to fluid 14) that surrounds array assembly 400.

An acoustic calibration is similarly performed on array assembly 400. The calibration of array assembly is performed with a k=0 excitation which is sufficient for use throughout the wavenumber-frequency plane since force sensors 404-1, . . . , 404-n typically have a flat response with respect to wavenumber.

In the present invention, cylinder 402 housing array assembly 400 is towed through the same type of fluid environment, e.g., water, and at the same speed(s) as array assembly 100. Array assembly 400 measures the pressure field in fluid 406 as a voltage designated herein by $V_{400}(k,\omega)$. However, the measured pressure field voltage $V_{400}(k,\omega)$ is a measure of the total pressure field at the surface of cylinder 402 (designated $P_{T-402}(k,\omega)$) filtered by the transfer function of cylinder 402/fluid 406. Accordingly, it is necessary to convert the measured pressure field voltage $V_{400}(k,\omega)$ to the filtered amount due only to $P_{o-402}(k,\omega)$.

Applying logic similar to that used to develop equation (17), $P_{T-402}(k,\omega)$ can be written $$P_{T-402}(k, \omega) = P_{o-402}(k, \omega)\left(1 + \left[\frac{P_{s-402}}{P_{o-402}}(k, \omega)\right]\right) \quad (19)$$

where the quantity $$\left[\frac{P_{s-402}}{P_{o-402}}(k, \omega)\right] \quad (20)$$

is a mathematical simulation obtained as explained in detail in applicant's aforereferenced publication.

Solving for $P_{o-402}(k,\omega)$ and replacing $P_{T-402}(k,\omega)$ with $V_{400}(k,\omega)/S_{a-400}$, yields $$P_{o-402}(k, \omega) = \frac{V_{400}(k, \omega)}{S_{a-400}\left(1 + \left[\frac{P_{s-402}}{P_{o-402}}(k, \omega)\right]\right)} \quad (21)$$

Similar to the calculations performed for array assembly 100, the inner pressure field $P_{i-402}(k,\omega)$ is obtained by dividing equation (21) by acoustic sensitivity $S_{a-400}$ of array assembly 400 and an aperture function $A_{400}(k,\omega)$ so that $$P_{i-400}(k,\omega) = \frac{V_{400}(k,\omega)}{\left(S_{a-400}\left(1 + \left[\frac{P_{s-402}}{P_{o-402}}(k,\omega)\right]\right)A_{400}(k,\omega)\right)} \quad (22)$$

In generating the turbulent flow field for both the outer and inner pressure field measurements (i.e., measurements of $V_{100}(k,\omega)$ and $V_{400}(k,\omega)$, each array assembly 100 and 400 should be maintained at the same set back distance relative to the forward end of the array structure. Further, each structure being towed should have the same outer diameter. By doing so, each generated turbulent flow field can be considered the same such that the relationship $$P_{o-100}(k,\omega) = P_{o-402}(k,\omega) \quad (23)$$

is true. Having established the condition set forth in equation (23) and insuring that the amount of $P_{i-400}(k,\omega)$ used is only due to $P_{o-402}(k,\omega)$ the transfer function for cylinder 402/fluid 406 (i.e., cylinder 12/fluid 14) is $$T_H(k,\omega) = \frac{P_{i-400}(k,\omega)}{P_{o-100}(k,\omega)} \quad (24)$$

where $P_{i-400}(k,\omega)$ is given by equation (22) and $P_{o-402}(k,\omega)$ is given by equation (18) further divided by the acoustic aperture function $A_{100}(k,\omega)$.

It is possible to simplify the number of terms to be evaluated in the expanded form of equation (24). For example, if the lengths of the force sensors used in both array assembly 100 and array assembly 400 are the same or approximately so, their spatial Fourier transforms will be nearly identical. This essentially causes the cancellation of the sensor aperture correction terms $A_{100}(k,\omega)$ and $A_{400}(k,\omega)$. Another simplification is that at low frequencies of approximately 100 Hz or less, the term $$\left[\frac{P_{s-402}}{P_{o-402}}(k,\omega)\right] \quad (25)$$

is negligible and can be ignored.

The advantages of the present invention are numerous. The field measurement calibration technique described herein will provide an accurate transfer function for a fluid-filled compliant cylinder of the type used in towed acoustic arrays. As a result, acoustic measurements of such towed arrays can be interpreted with an increased certainty.

Although the present invention has been described relative to a particular embodiment, it is not so limited. For example, the force sensors used in array assemblies 100 and 400 can be pressure sensors (as described) or strain sensors. Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method of calibrating the transfer function for a fluid-filled compliant cylinder as a function of wavenumber and frequency, comprising the steps of:

providing a first compliant cylinder filled with air and having a first linear array of force sensors coupled to the exterior surface of said first compliant cylinder and spaced along the length thereof;

immersing said first compliant cylinder with said first linear array coupled thereto in a fluid environment;

generating a first turbulent flow field in said fluid environment at said first linear array;

measuring a first output generated by said first linear array in said first turbulent flow field, wherein said first output is indicative of pressure incident upon said first linear array;

providing a second compliant cylinder having the same outer diameter as said first compliant cylinder, said second compliant cylinder having a second linear array of force sensors contained therein and spaced along a central longitudinal axis thereof, said second compliant cylinder further being filled with a fluid that surrounds said second linear array;

immersing said second compliant cylinder with said second linear array contained therein in said fluid environment;

generating a second turbulent flow field in said fluid environment about said second complaint cylinder, wherein said first turbulent flow field and said second turbulent flow field are similar in magnitude; and measuring a second output generated by said second linear array in said second turbulent flow field, wherein said second output is indicative of pressure incident upon said second linear array, and wherein a ratio of said first output to said second output is indicative of the transfer function of said second compliant cylinder filled with said fluid.

2. A method according to claim 1 further comprising the step of adjusting said first output by a calibrated sensitivity of said first linear array.

3. A method according to claim 1 further comprising the step of adjusting said second output by a calibrated sensitivity of said second linear array.

4. A method according to claim 1 wherein said step of generating said first turbulent flow field comprises the step of towing said first compliant cylinder through said fluid environment, and wherein said step of generating said second turbulent flow field comprises the step of towing said second compliant cylinder through said fluid environment.

5. A method according to claim 4 wherein said steps of towing are performed at the same speed.

6. A method according to claim 1 further including the step of spacing said second linear array of force sensors approximately the same as said first linear array of force sensors.

7. A method of calibrating the transfer function for a fluid-filled compliant cylinder as a function of wavenumber and frequency, comprising the steps of:

providing a first compliant cylinder filled with air and having a first linear array of force sensors coupled to the exterior surface of said first compliant cylinder and spaced along the length thereof;

immersing said first compliant cylinder with said first linear array coupled thereto in a fluid environment;

generating a first turbulent flow field in said fluid environment at said first linear array;

measuring a first output voltage generated by said first linear array in said first turbulent flow field, wherein said first output voltage is indicative of pressure incident upon said first linear array;

adjusting said first output voltage by a calibrated sensitivity of said first linear array;

providing a second compliant cylinder having the same outside diameter as said first compliant cylinder, said second compliant cylinder having a second linear array of force sensors contained therein and spaced along a central longitudinal axis thereof wherein the number of force sensors in said first linear array is approximately identical to the number of force sensors in said second linear array, said second compliant cylinder further being filled with a fluid that surrounds said second linear array;

immersing said second compliant cylinder with said second linear array contained therein in said fluid environment;

generating a second turbulent flow field in said fluid environment about said second complaint cylinder, wherein said first turbulent flow field and said second turbulent flow field are similar in magnitude;

measuring a second output voltage generated by said second linear array in said second turbulent flow field, wherein said second output voltage is indicative of pressure incident upon said second linear array; and adjusting said second output voltage by a calibrated sensitivity of said second linear array, wherein a ratio of said first output voltage so-adjusted to said second output voltage so-adjusted is indicative of the transfer function of said second compliant cylinder filled with said fluid.

8. A method according to claim 7 wherein said step of generating said first turbulent flow field comprises the step of towing said first compliant cylinder through said fluid environment, and wherein said step of generating said second turbulent flow field comprises the step of towing said second compliant cylinder through said fluid environment.

9. A method according to claim 8 wherein said steps of towing are performed at the same speed.

10. A method according to claim 7 further including the step of spacing said second linear array approximately the same as said first linear array.

* * * * *